(12) United States Patent
Lattime et al.

(10) Patent No.: US 8,991,829 B2
(45) Date of Patent: *Mar. 31, 2015

(54) NON-CONTACT LABYRINTH SEAL ASSEMBLY AND METHOD OF CONSTRUCTION THEREOF

(71) Applicants: Federal-Mogul Corporation, Southfield, MI (US); The Timken Company, Canton, OH (US)

(72) Inventors: Scott B. Lattime, Stow, OH (US); Kevin M. Dillon, Waterford, MI (US); Alicia Black, Maybee, MI (US); Richard Borowski, Canton, OH (US); Roger Trentman, Fort Jennings, OH (US); Stephen E. Brister, North Canton, OH (US); Carl F. Meadows, Doylestown, OH (US); Brian M. Hupp, Canton, OH (US); David G. Toth, Canton, OH (US)

(73) Assignees: The Timken Company, Canton, OH (US); Federal-Mogul Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/708,294

(22) Filed: Dec. 7, 2012

(65) Prior Publication Data

US 2014/0159318 A1    Jun. 12, 2014

(51) Int. Cl.
| | |
|---|---|
| *F01D 11/02* | (2006.01) |
| *F16J 15/447* | (2006.01) |
| *F16J 15/32* | (2006.01) |
| *F16J 15/40* | (2006.01) |

(52) U.S. Cl.
CPC .......... *F16J 15/447* (2013.01); *F16J 15/3256* (2013.01); *F16J 15/40* (2013.01); *F16J 15/4474* (2013.01)
USPC .......................... 277/412; 277/409; 277/411

(58) Field of Classification Search
USPC .................. 277/411, 412, 423, 427, 428, 409
See application file for complete search history.

(56) References Cited

U.S. PATENT DOCUMENTS

| | | | | |
|---|---|---|---|---|
| 5,028,054 A | * | 7/1991 | Peach | ........................ 277/348 |
| 6,845,986 B2 | * | 1/2005 | Hood et al. | .................. 277/409 |
| 8,342,535 B2 | * | 1/2013 | Lattime et al. | ............... 277/412 |

(Continued)

FOREIGN PATENT DOCUMENTS

| | | |
|---|---|---|
| EP | 0021679 | 1/1981 |
| JP | 56006921 | 1/1981 |

(Continued)

OTHER PUBLICATIONS

Extended European Search report, mailed Apr. 25, 2013 (EP08851903).

*Primary Examiner* — Gilbert Lee
(74) *Attorney, Agent, or Firm* — Robert L. Stearns; Dickinson Wright, PLLC (57) ABSTRACT

A non-contact labyrinth seal assembly, bearing assembly therewith, and method of construction thereof, has an outer rigid carrier and an inner sleeve. The carrier has an outer cylindrical flange and a radially inwardly extending leg and the sleeve has a cylindrical wall and a radially outwardly extending flange. A body is attached to at least one of the leg and the flange, wherein the body provides, at least in part, a purely non-contact labyrinth passage extending between the carrier and the sleeve.

18 Claims, 7 Drawing Sheets

(56) References Cited

U.S. PATENT DOCUMENTS

| | | |
|---|---|---|
| 2003/0184021 A1 | 10/2003 | Hatch et al. |
| 2009/0127795 A1* | 5/2009 | Lattime et al. ............... 277/412 |

FOREIGN PATENT DOCUMENTS

| | | |
|---|---|---|
| JP | 02025774 | 2/1990 |
| JP | 03046021 | 4/1991 |
| JP | 5058953 U | 8/1993 |
| JP | 05058955 | 8/1993 |
| JP | 9144767 A | 6/1997 |
| JP | 2003240003 | 8/2003 |
| JP | 2004100842 | 4/2004 |
| JP | 2005076723 | 3/2005 |
| JP | 2007009938 A | 1/2007 |
| JP | 2007177815 A | 7/2007 |
| JP | 2008151174 A | 7/2008 |
| KR | 1020060134016 A | 12/2006 |

* cited by examiner

NON-CONTACT LABYRINTH SEAL ASSEMBLY AND METHOD OF CONSTRUCTION THEREOF

CROSS-REFERENCE TO RELATED APPLICATIONS

This is a divisional application which claims the benefit of U.S. Provisional Application Ser. No. 60/989,190, filed Nov. 20, 2007, and U.S. Utility application Ser. No. 12/273,995, filed Nov. 19, 2008, which is incorporated herein by reference in its entirety.

BACKGROUND OF THE INVENTION

1. Technical Field

This invention relates generally to seal assemblies, and more particularly to non-contact seal assemblies for roller bearings.

2. Related Art

It is known to provide seals for sealed, self-contained bearing assemblies with preset clearances and lubrication. Being preset and lubricated, these bearings can be fitted over an axle journal and within a housing to enable relative rotation between the axle and the housing. These bearings have experienced wide-spread use on axles of railway cars, but they are also used in other applications, such as for crane wheels, table rolls and shears, and even for the work rolls of rolling mills, for example When used in railway car applications, the bearings are subjected to high levels of contaminants, such as moisture, dirt and debris. In order to maintain the useful life of the bearing, the contaminants must remain external to the oil side of the bearing. Accordingly, the seals in these bearings play a vital role in prolonging the useful life of the bearings.

Seals for railway bearings are known to have an outer case configured for attachment to an outer race of the bearing and an elastomeric seal element bonded to the seal case. The seal element typically extends radially inwardly from the outer case adjacent an oil side of the bearing to a primary lip that bears against an axially extending surface of a wear ring located adjacent to the inner race of the bearing. The seal element sometimes include secondary lips configured axially outwardly adjacent an air side of the bearing to bear against a radially extending leg of the wear ring. To maintain sealing engagement between the primary lip and the wear ring, a garter spring is commonly used to encircle the primary lip to force it snugly against the wear ring. The secondary lip is typically maintained in contact with the wear ring under the bias of the elastomer material from which the seal element is constructed. With the primary lip being biased into engagement with the wear ring, the primary lip generally provides such an effective barrier to the egress of the lubricant from within the bearing along the wear ring, that it is known for the secondary lip to starve for lubrication and to overheat. This, can cause the secondary lip to harden, thereby diminishing the overall effectiveness of the seal. In addition, the friction generated by the primary and secondary seal lips against the wear ring impart a measure of resistance to rotation, which tends to cause undue wear to the seal, and further, requires additional energy to overcome, thereby diminishing the efficiencies of the engine powering the railcar.

The seal of the present invention, among other things, including economic benefits realized from constructing various embodiments discussed herein, operates with considerably less torque than conventional seals of the type currently utilized with the bearings discussed above. Moreover, it provides a generally continuous width labyrinth passage from an air side of the seal to an oil side of the seal to prevent the ingress of contaminants.

SUMMARY OF THE INVENTION

According to one aspect of the invention, a non-contact labyrinth seal assembly has an outer rigid carrier having a generally cylindrical outer flange extending axially relative to a central axis of the assembly with a leg extending radially inwardly from the outer flange toward the central axis. A body is attached to the leg, wherein the body has a radially outward lip and a radially inward lip. The lips extend axially from the leg toward an air side of the assembly with the radially outward lip diverging outwardly from the central axis to provide a first annular channel between the lips and a second annular channel between the radially outward lip and the leg. The first annular channel faces axially toward the air side of the assembly and the second annular channel faces radially outwardly from the central axis. The assembly further has a sleeve with an axially extending cylindrical wall and an annular first flange extending radially outwardly from the wall. The first flange has an annular projection extending axially into the first annular channel to provide a non-contact labyrinth passage extending along a serpentine path between the lips and the annular projection.

According to another aspect of the invention, a railway roller bearing non-contact labyrinth seal assembly includes an outer rigid carrier having a generally cylindrical outer flange extending axially relative to a central axis of the assembly with a leg extending radially inwardly from the outer flange toward the central axis. A seal body is attached to the leg. The seal body has a radially outward lip and a radially inward lip extending axially from the leg and diverging from one another toward an air side of the assembly to provide a first annular channel between the lips and a second annular channel between the radially outward lip and the leg. The assembly further includes a sleeve having a cylindrical wall and an annular first flange extending radially outwardly from the wall. The first flange has an annular projection extending axially into the first annular channel between the lips and in non-contacting relation with the lips to provide a non-contact generally □-shaped labyrinth passage extending between the lips and the annular projection.

According to yet another aspect of the invention, a railway roller bearing non-contact labyrinth seal assembly is provided. The seal assembly has an outer rigid carrier having a generally cylindrical outer flange extending axially relative to a central axis of the assembly with a leg extending radially inwardly from the outer flange toward the central axis. Further, the assembly includes a sleeve having a cylindrical wall with an annular projection extending radially outwardly from the wall. Further, the assembly has a seal body attached to one of the leg or the projection, wherein the seal body extends toward and remains out of contact with the other of the leg or the lip to provide a non-contact labyrinth seal passage between an oil side of the seal assembly and an air side of the seal assembly.

According to yet another aspect of the invention, a method of constructing a purlely non-contact labyrinth seal assembly is provided. The method includes forming an outer rigid carrier having a generally cylindrical outer flange extending axially relative to a central axis of the assembly with a leg extending radially inwardly from the outer flange toward the central axis. Further, forming a sleeve having cylindrical wall with an annular projection extending radially outwardly from the wall. Then, attaching a seal body to at least one of the leg and the projection and extending toward and remaining out of contact with the other of the leg and the projection to provide a non-contact labyrinth seal passage extending between an oil side of the seal assembly and an air side of the seal assembly.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
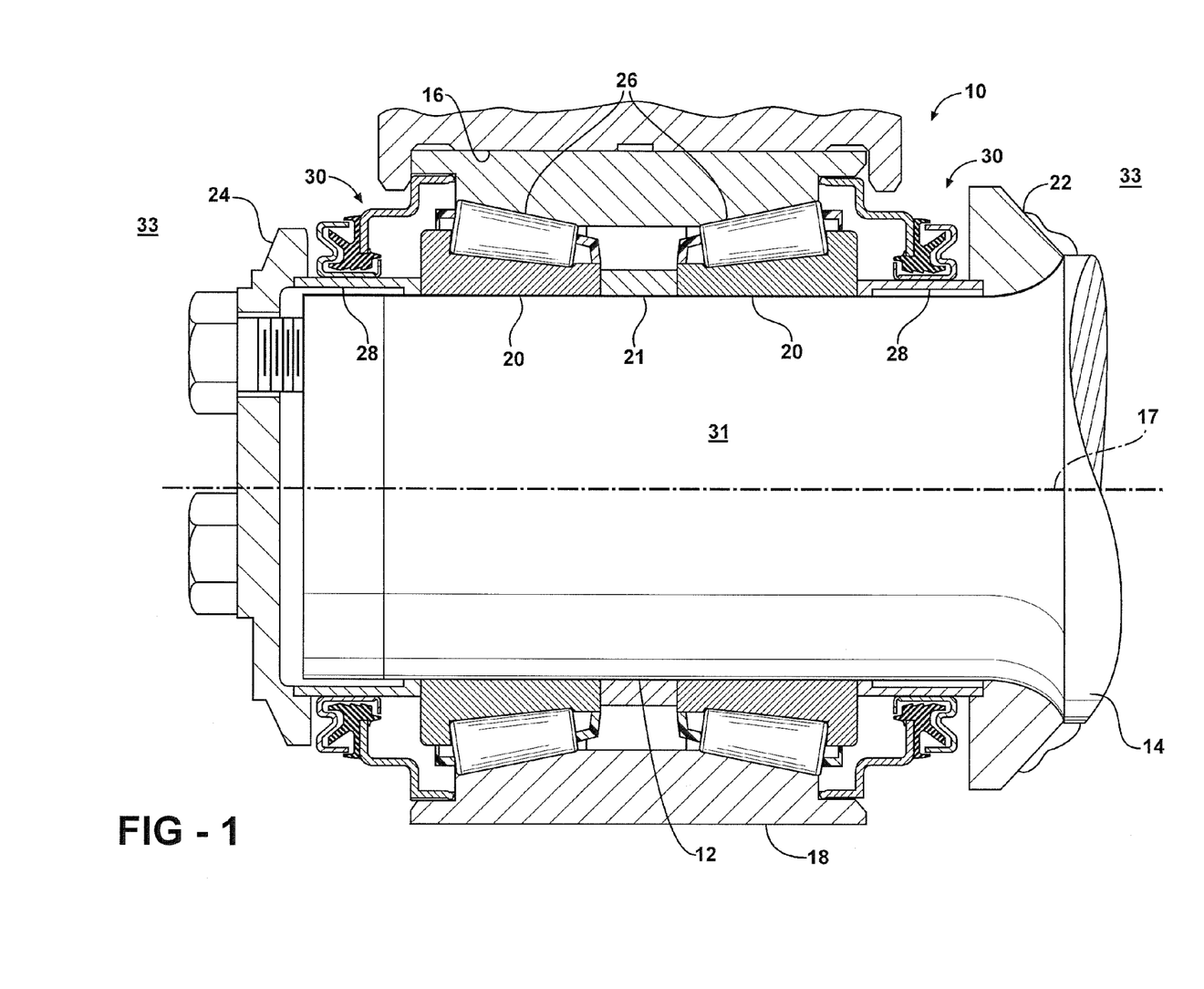
FIG. 1 is a partial cross-sectional view of a shaft and roller bearing assembly having a non-contact labyrinth seal assembly constructed in accordance with one presently preferred embodiment of the invention.

Referring in more detail to the drawings, FIG. 1 illustrates a self-contained, pre-lubricated and preset bearing assembly 10 disposed about a journal 12 of a shaft or axle 14 and within a housing 16 to provide relative rotation between the axle 14 and housing 16 about a central axis 17 of the shaft 14 and assembly 10. In the application shown, such as a railway bearing application, for example, the bearing assembly 10 has a single outer race 18 received in the housing and a pair of inner races 20 separated by a spacer 21 and being clamped between a backing ring 22 and an end cap 24, with a plurality of rollers 26 maintained between the inner races 20 and the outer race 18. The backing ring 22 and the end cap 24 each bear against spacer rings 28, sometimes referred to as seal wear rings, which in turn bear against the inner races 20. The bearing assembly 10 has a pair of purely non-contact labyrinth seal assemblies 30, illustrated in FIGS. 1 and 2 in accordance with one aspect of the invention, on opposite sides of the bearing assembly 10 to maintain the lubrication on an oil side 31 of the seal assemblies 30 and within bearing assembly 10 and to prevent the ingress of contamination from an air side 33 of the seal assemblies 30, such as dirt and debris, into the bearing assembly 10. Accordingly, the seal assemblies 30, having a completely non-contact labyrinth construction, as discussed in more detail hereafter, produce minimal friction in use, while effectively preventing the egress of lubrication and ingress of contamination, thus, enhancing the performance and prolonging the useful life of the bearing assembly 10.

Figure 2:
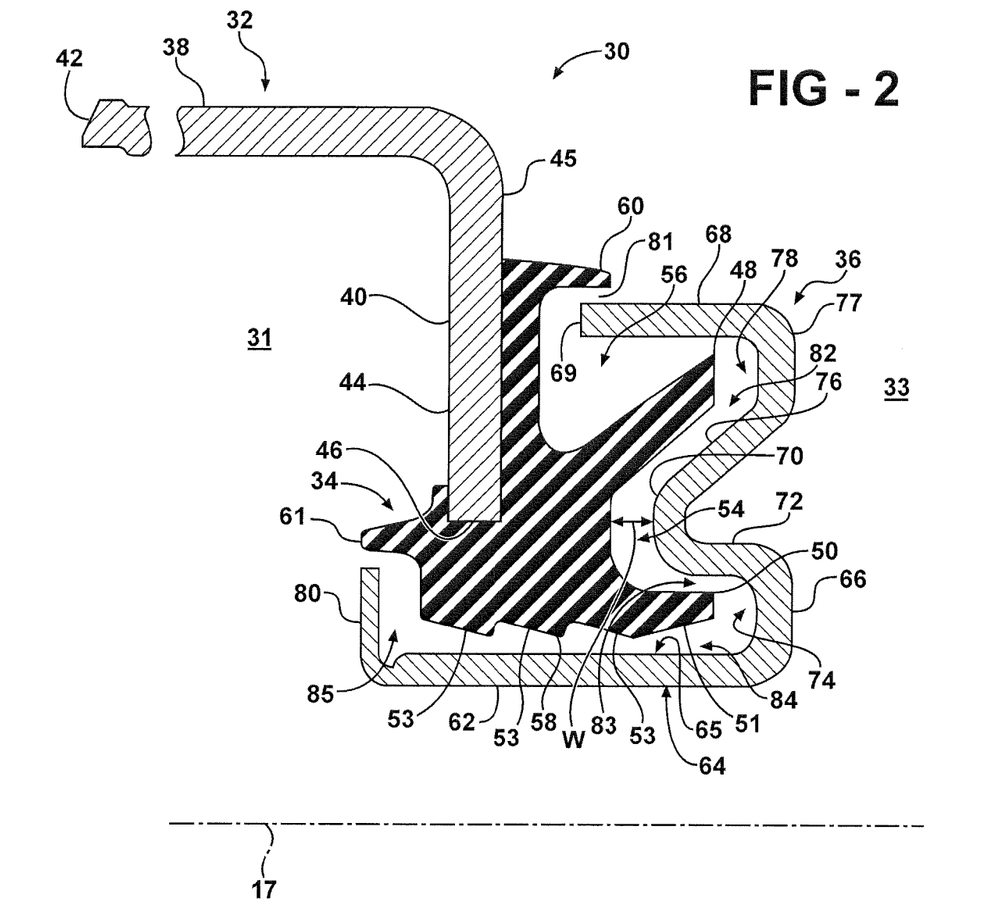
FIG. 2 is an enlarged cross-sectional view of the non-contact labyrinth seal assembly of FIG. 1.

As best shown in FIG. 2, each non-contact labyrinth seal assembly 30 has an outer rigid carrier 32, preferably constructed from metal, such as from steel in a stamping operation, with an elastomeric seal body 34 attached thereto, and a metal inner sleeve 36. The carrier 32 has a generally cylindrical outer flange 38 extending axially relative to the central axis 17 of the assembly 30 with an annular leg 40 extending radially inwardly from the outer flange 38 toward the central axis 17. The outer flange 38 extends axially to a free end 42 that is preferably configured for direct attachment to the outer race 18 of the bearing assembly 10, though it could be configured for attachment to the housing 16, or otherwise. The leg 40 has opposite oil and air sides 44, 45 corresponding to and facing the oil and air sides 31, 33 of the bearing assembly 10, respectively, that extend to a free end 46. One or both of the sides 44, 45 can be treated, if desired, to facilitate bonding of the seal body 34 thereto, such as in an etching or sand/bead blasting operation, for example.

The elastomeric seal body 34 is attached to the leg 40, such as by using a suitable adhesive or by molding directly to the leg 40. The body 34 is shown here, by way of example and without limitation, as being molded about the free end 46 of the leg 40 in bonded relation to the leg 40 and substantially covering the air side 45 of the leg 40. The body 34 has a radially outward lip 48 and radially inward lip 50. The lips 48, 50 extend laterally from the leg 40 toward the air side 33 of the assembly 30. The radially outward lip 48 diverges from the inward lip 50 and outwardly from the central axis 17 to provide a first annular channel 54 between the lips 48, 50 and a second annular gutter, referred to hereafter as channel 56, between the radially outward lip 48 and the leg 40 of the carrier 32. Accordingly, the first annular channel 54 faces axially toward the air side 33 of the assembly 30 and the second annular channel 56 faces radially outwardly from the central axis 17, and acts to inhibit the ingress of contamination into the bearing assembly 10. The body also has an undulating surface 58 facing radially inwardly toward the central axis 17. The undulating surface 58 extends axially along an inner bottom surface of the body 34, and is shown here as being provided partially by the inward lip 50. The lip 50 has a radially inwardly facing surface 51 that diverges away from the axis 17 toward the air side 33 of the assembly 30, such that during relative movement between the carrier 32 and the inner sleeve 36, the surface 51 acts to repell the ingress of contamination into the bearing assemlby 10. The undulating surface 50 also has a plurality of radially inwardly facing surfaces 53 axially inwardly from the surface 51. The surfaces 53 diverge away from the axis 17 toward the oil side 31 of the assembly 30, such that during relative movement between the carrier 32 and the inner sleeve 36, the surfaces 53 act to repell the egress of lubrication from the bearing assemlby 10. The body 34 further includes an exclusion lip 60 extending axially from the leg 40 toward the air side 33 of the assembly 30. The exclusion lip 60 is located radially outwardly from and in partially overlapping relation to the second annular channel 56. In addition, the body 34 further includes a containment lip 61 extending axially toward the oil side 31 of the assembly 30. The containment lip 61 is shown here, by way of example and without limitation, as extending generally from the free end 46 of the leg 40 axially toward the oil side 31 of the assembly 30.

The metal inner sleeve 36 is preferably constructed from steel in a stamping operation, though other metal materials and processes could be used. The inner sleeve 36 has an axially extending cylindrical wall 62 with an inner surface 64 configured for operable disposal about the shaft 14, and shown in FIGS. 1 and 2, by way of example and without limtation, as being received on the spacer rings 28. The inner sleeve 36 also has an outer surface 65 opposite the inner surface 64. The sleeve 36 has an annular wall, also referred to as flange, or lip 66 extending radially outwardly from the wall 62 to an exclusion flange 68. The exclusion flange 68 extends axially from the barrier 66 in a radially outwardly overlapping relation with the cylindrical wall 62 to a free end 69, wherein the wall 62 and the exclusion flange 68 are shown here as being substantially parallel to one another. The barrier 66 has an annular projection 70 extending axially between the cylindrical wall 62 and the exclusion flange 68, and is shown here as being upset in the material of the the sleeve 36, such that the projection 70 is plastically deformed in the barrier 66. The projection 70 is generally □-shaped, as shown in FIG. 2, having an annular lower leg 72 spaced radially outward in overlapping relation with the cylindrical wall 62 to provide an annular pocket 74 between the projection 70 and the cylindrical wall 62. The projection 70 has an annular upper leg 76 diverging radially outwardly from the lower leg 72 toward the air side 33, wherein the upper leg 76 acts as a slinger to repell contamination radially ouwardly from the seal assembly 30. The upper leg 76 transitions to the exclusion flange 68 at a reverse folded portion 77. Accordingly, another annular pocket 78 is formed between the upper leg 76 and the exclusion flange 68, wherein the pocket 78 is radially outwardly aligned with the radially inward pocket 74. In addition, the sleeve 36 has a containment flange 80 extending radially outwardly from the cylindrical wall 62. The containment flange 80, in addition to maintaining the assembly 30 in an assembled state, assists in preventing lubrication within the bearing assembly 10 from escaping the oil side 31, while also acting to prevent the ingress of any contamination into the oil side 31.

With the carrier 32 assembled to the outer race 18 and the sleeve 36 disposed about the axle 14, the bearing assembly 10 is maintained in a preset condition with the seal assembly 30 being maintained in a purely non-contact labyrinth seal configuration. Accordingly, the seal body 34 and its associated features remain in spaced relation from the sleeve 36. For example, when fully assembled, the annular projection 70 of the sleeve 36 extends axially into the first annular channel 54 to provide a non-contact labyrinth passage 82 that extends along a serpentine path between the respective radially outward and radially inward lips 48, 50 and the annular projection 70. Further, the radially inward lip 50 extends into the pocket 74 in non-contacting relation with the sleeve 36 to provide a non-contact labyrinth passage 83 extending in open communication from the labyrinth passage 82, wherein the labyrinth passage 83 extends over a generally U-shaped or serpentine path within the pocket 74. Further again, the undulating surface 58 of the seal body 34 extends axially in spaced relation from the outer surface 65 of the sleeve wall 62 to provide a non-contact labyrinth passage 84 extending axially in open communication from the labyrinth passage 83. In addition, the exclusion flange 68 of the sleeve 36 extends in radially outward overlapping relation with the second annular channel 56, wherein the exclusion flange 68 is spaced radially outwardly from the radially outward lip 48. At the same time, the exclusion lip 60 of the seal body 34 extends in spaced, overlapping relation with the free end 69 of the exclusion flange 68, with the exclusion lip 60 being shown as being spaced radially outwardly from the exclusion flange 68 to provide a gap, wherein the gap provides a generally horizontally extending, non-contact labyrinth passage 81 configured in open communication with the second annular channel 56. Accordingly, the gutter or channel 56 is able to contain contamination on the radially upward half section of the seal assembly 30 and drain or dispell the contamination through the labyrinth passage 81 on the radially downward half of the seal assembly 30 with the assistance of gravitational and centripal forces. Further yet, the containment flange 80 extends radially outwardly from the cylindrical wall 62 radially beyond at least a portion of the elastomeric body 34, shown here as extending radially beyond the undulating surface 58, while remaining axially spaced from the undulating surface 58 to maintain a non-contact labyrinth passage 85 extending from the labyrinth passage 84. The containment lip 61 extends axially toward the oil side 31 in radially outwardly overlapping relation with the containment flange 80. The containment lip 61 is spaced radially outwardly from the containment flange 80 to extend the non-contacting labyrinth passage 85 in open communication with the oil side 31 of the assembly 30. Accordingly, seal assembly 30 is configured to maintain an entirely non-contact construction, with the continuously extending labyrinth passages 81, 82, 83, 84, 85 providing minimal friction in use, while preventing the ingress of contamination and the egress of lubrication. As shown, the labyrinth passages 82, 83, 84, and 85 are provided having a generally or substantially constant width (W), such as between about 0.010-0.100", extending along the radially outward lip 48, the radially inward lip 50 and the undulating surface 58. It should be recognized that some variations in the width W along the labyrinth passages 82, 83, 84, 85 is contemplated, such as would inherently occur along the undulating surface 58, for example.

Figure 3:
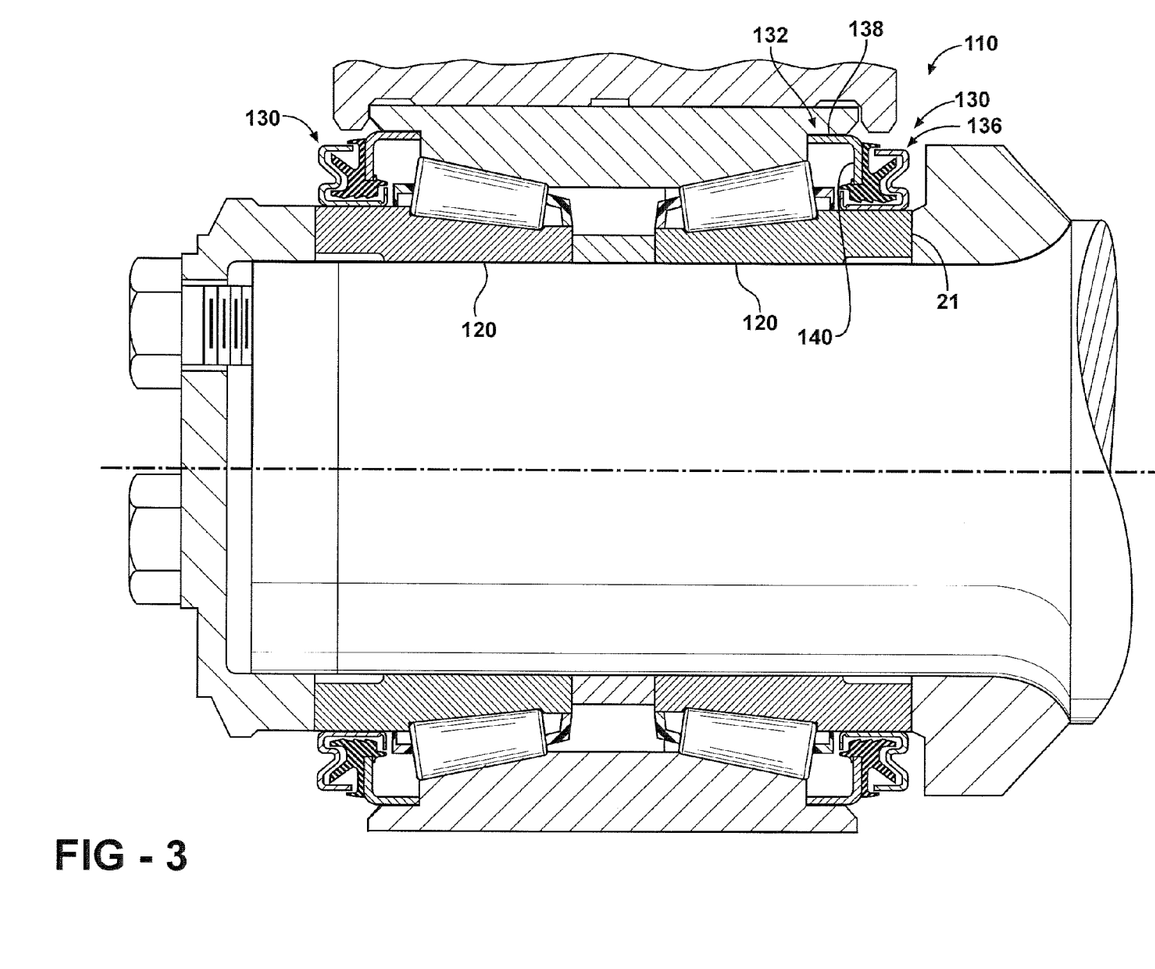
FIG. 3 is a partial cross-sectional view of a shaft and roller bearing assembly with a non-contact labyrinth seal assembly constructed in accordance with another presently preferred embodiment of the invention.

In FIG. 3, a self-contained, pre-lubricated and preset bearing assembly 110 is shown in accordance with another presently preferred construction, wherein the same reference numerals as used above, offset by a factor of 100, are used to identify similar features. The bearing assembly 110 is constructed generally same as the previously discussed bearing assembly 10, with a labyrinth seal assembly 130 operably coupled to the bearing assembly 110, thereby providing a completely non-contact labyrinth seal construction, however, rather than an inner sleeve 136 of the seal assembly 130 being mounted on a spacer ring, the inner sleeve 136 is configured to be mounted directly on an outer surface of a thrust rib 21 of an inner race 120. As such, the configuration of a carrier 132 of the seal assembly 130 is altered to accommodate the change in configuration of the inner sleeve 136. In the embodiment illustrated, the carrier 132 is generally L-shaped in cross-section, with a leg 140 of the carrier 132 depending directly radially inwardly from a cylindrical outer flange 138 of the assembly 110. Otherwise, the seal assembly 130 is the same as the previously discussed seal assembly 30, and thus, no further discussion is believed necessary.

Figure 4:
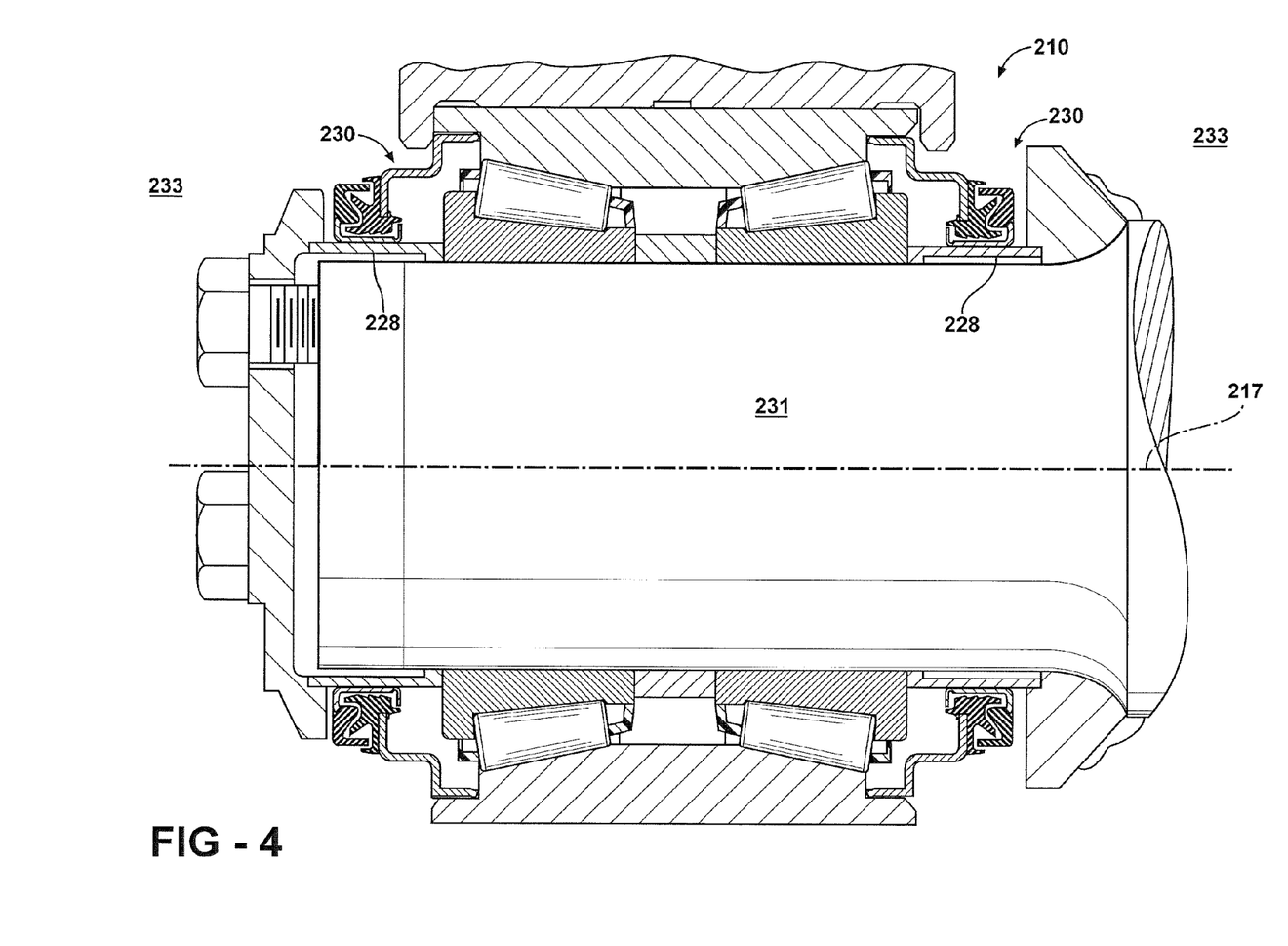
FIG. 4 is a cross-sectional view of a bearing assembly with a non-contact labyrinth seal assembly constructed in accordance with yet another presently preferred aspect of the invention.
Figure 4A:
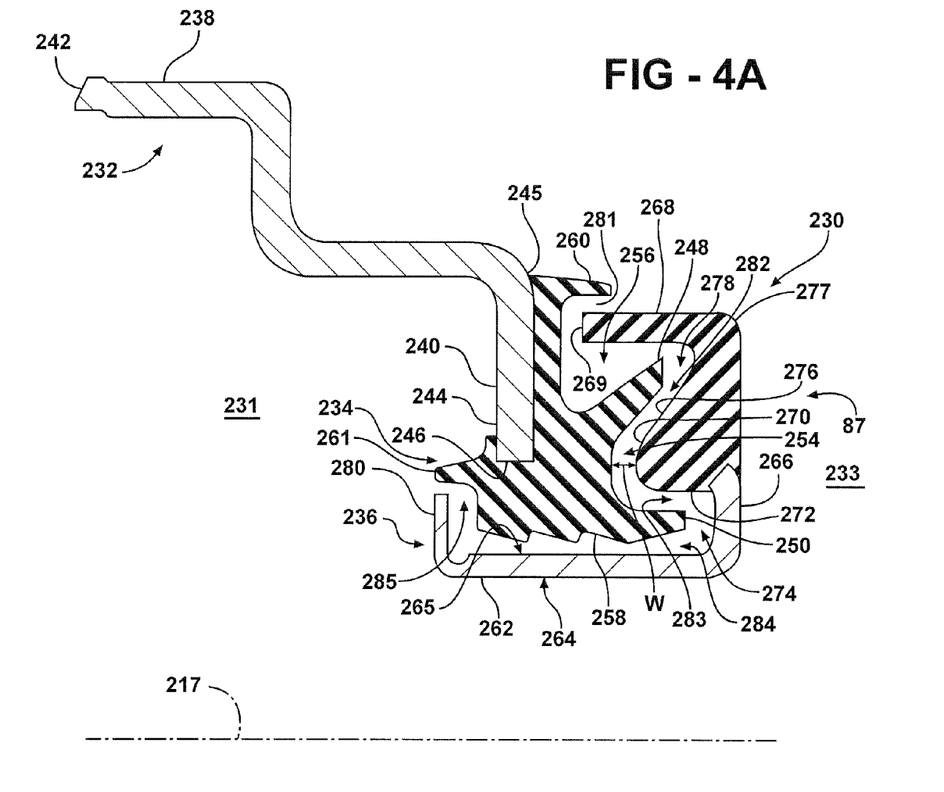
FIG. 4A is an enlarged cross-sectional view of the non-contact labyrinth seal assembly of FIG. 4.

In FIG. 4, a self-contained, pre-lubricated and preset bearing assembly 210 with a non-contact labyrinth seal assembly 230 constructed in accordance with another presently preferred embodiment is shown, wherein the same reference numerals as used above, offset by a factor of 200, are used to identify similar features. As best shown in FIG. 4A, the seal assembly 230 has an outer rigid carrier 232, preferably constructed from metal, such as from steel in a stamping operation, a seal body 234 attached to the carrier 232, a metal inner sleeve 236, and an elastomeric seal body, referred to hereafter as elastomeric body or simply body 87, attached to the inner sleeve 236 to provide a unitary inner sleeve subassembly. The carrier 232 has a generally cylindrical outer flange 238 extending axially relative to a central axis 217 of the assembly 230 with a leg 240 extending radially inwardly from the outer flange 238 toward the central axis 217. The outer flange 238 extends axially to a free end 242 that is preferably configured for direct attachment an outer race of a bearing assembly, though it could be configured for attachment to other than the bearing assembly. The leg 240 has opposite oil and air sides 244, 245 facing an oil side 231 and air side 233, respectively, wherein the leg 240 extends to a free end 246.

The elastomeric seal body 234 is attached to the free end 246 of the leg 240, and is configured generally the same as described above with regard to the seal body 34. Accordingly, the seal body has a pair of lips 248, 250, with the radially outward lip 248 diverging from the radially inward lip 250 and outwardly from the central axis 217 to provide a first annular channel 254 between the lips 248, 250 and a second annular channel 256 between the radially outward lip 248 and the leg 240 of the carrier 232. Further, the body also has an undulating surface 258 facing radially inwardly toward the central axis 217 and extending axially along an inner bottom surface of the body 234, and being provided in part by the inward lip 250. The body 234 further includes an exclusion lip 260 extending axially from the leg 240 toward the air side 233 of the assembly 230. The exclusion lip 260 is located radially outwardly from and in partially overlapping relation to the second annular channel 256. In addition, the body 234 further includes a containment lip 261 extending axially toward the oil side 231 of the assembly 230. The containment lip 261 is shown here, by way of example and without limitation, as extending generally from the free end 246 of the leg 240 in radially outward relation to the undulating surface 258.

The metal inner sleeve 236 and the elastomeric body 87 are configured having a generally similar cross-sectional shape as the inner sleeve 36 discussed above. Accordingly, the inner sleeve 236 and the elastomeric body 87 subassembly cooperate with the outer metal carrier 232 and seal body 234 to provide a non-contact labyrinth seal assembly similarly as discussed above with regard to the seal assembly 30. However, the elastomeric body 87 negates the need for many of the progressive manufacturing processes used to form the aforementioned upset annular projection 70 and exclusion flange 68 of the carrier 32. The inner sleeve 236 is preferably constructed from steel, such as in a stamping operation, although other manufacturing processes are contemplated. The inner sleeve 236 has an axially extending cylindrical wall 262 with an inner surface 264 and an outer surface 265, with the inner surface 264 being configured for operable disposal about a shaft, inner race of a bearing, or, as illustrated, by way of example and without limitation, a spacer ring 228 (FIG. 4). The sleeve 236 is generally U-shaped in axial cross-section, having an annular wall, also referred to as flange, barrier, projection or lip 266 extending radially outwardly from the cylindrical wall 262. In addition, the sleeve 236 has a containment flange 280 extending radially outwardly from the cylindrical wall 262. The containment flange 280 functions similarly as discussed above with regard to the containment flange 80.

The elastomeric body 87 is preferably molded to the lip 266 of the inner sleeve 236, with the body 87 being formed from an elastomeric or polymeric material, although it could be otherwise attached, such as via an adhesive, for example. The elastomeric body 87 forms an exclusion flange 268 extending axially from the metal lip 266 in a radially outwardly overlapping relation with the cylindrical wall 262 to a free end 269, wherein the wall 262 and the exclusion flange 268 are shown here as being substantially parallel to one another. The body 87 has an annular projection 270 extending axially inwardly from the lip 266 between the cylindrical wall 262 and the exclusion flange 268. The projection 270 is generally nose shaped, having generally the same inside conour as that of the projection 70 discussed above. As such, the projection has an annular lower, radially inward inner surface 272 spaced radially outward in overlapping relation with the cylindrical wall 262 to provide an annular pocket 274 between the projection 270 and the cylindrical wall 262. The projection 270 has an annular upper, radially outward inner surface 276 diverging radially outwardly from the lower inner surface 272 toward the air side 233, wherein the upper inner surface 276 transitions to the exclusion flange 268 at a reverse molded portion 277. Accordingly, another annular pocket 278 is formed between the upper inner surface 276 and the exclusion flange 268, wherein the pocket 278 is radially outwardly aligned with the radially inward pocket 274.

As shown in FIG. 4, with the carrier 232 assembled to the outer race 218 and the sleeve 236 disposed about the axle 214, the bearing assembly 210 is maintained in a preset condition with the seal assembly 230 being maintained in a purely non-contact labyrinth seal configuration. Accordingly, the seal body 234 and its associated features remain in spaced relation from the sleeve 236 and the elastomeric body 87. For example, when fully assembled, the annular projection 270 of the elastomeric body 87 extends axially into the first annular channel 254 to provide a non-contact labyrinth passage 282 that extends along a serpentine path between the respective radially outward and radially inward lips 248, 250 and the annular projection 270. Further, the radially inward lip 250 extends into the pocket 274 in non-contacting relation with the sleeve 236 and the elastomeric body 87 to provide a non-contact labyrinth passage 283 extending in open communication from the labyrinth passage 282, wherein the labyrinth passage 283 extends over a generally U-shaped or serpentine path within the pocket 274. Further again, the undulating surface 258 of the seal body 234 extends axially in spaced relation from the outer surface 265 of the sleeve wall 262 to provide a non-contact labyrinth passage 284 extending axially in open communication from the labyrinth passage 283. In addition, the exclusion flange 268 of the elastomeric body 87 extends in radially outward overlapping relation with the second annular channel 256, wherein the exclusion flange 268 is spaced radially outwardly from the radially outward lip 248. At the same time, the exclusion lip 260 of the seal body 234 extends in spaced, overlapping relation with the free end 269 of the exclusion flange 268, with the exclusion lip 260 being shown as being spaced radially outwardly from the exclusion flange 268 to provide a gap, wherein the gap provides a generally horizontally extending, non-contact labyrinth passage 281 configured in open communication with the second annular channel 256. Further yet, the containment flange 280 extends radially outwardly from the cylindrical wall 262 radially beyond at least a portion of the elastomeric seal body 234, shown here as extending radially beyond the undulating surface 258, while remaining axially spaced from the undulating surface 258 to maintain a non-contact labyrinth passage 285 extending from the labyrinth passage 284. The containment lip 261 extends axially toward the oil side 231 in radially outwardly overlapping relation with the containment flange 280. The containment lip 261 is spaced radially outwardly from the containment flange 280 to extend the non-contacting labyrinth passage 285 in open communication with the oil side 231 of the assembly 230. Accordingly, seal assembly 230 is configured to maintain an entirely non-contact construction, with the continuously extending labyrinth passages 281, 282, 283, 284, 285 providing minimal friction in use, while preventing the ingress of contamination and the egress of lubrication. As shown, the labyrinth passages 282, 283, 284, and 285 are provided having a generally or substantially constant width (W) extending along the radially outward lip 248, the radially inward lip 250 and the undulating surface 258. It should be recognized that some variations in the width W along the labyrinth passages 282, 283, 284, 285 is contemplated, such as would inherently occur along the undulating surface 58, for example.

Figure 4B:
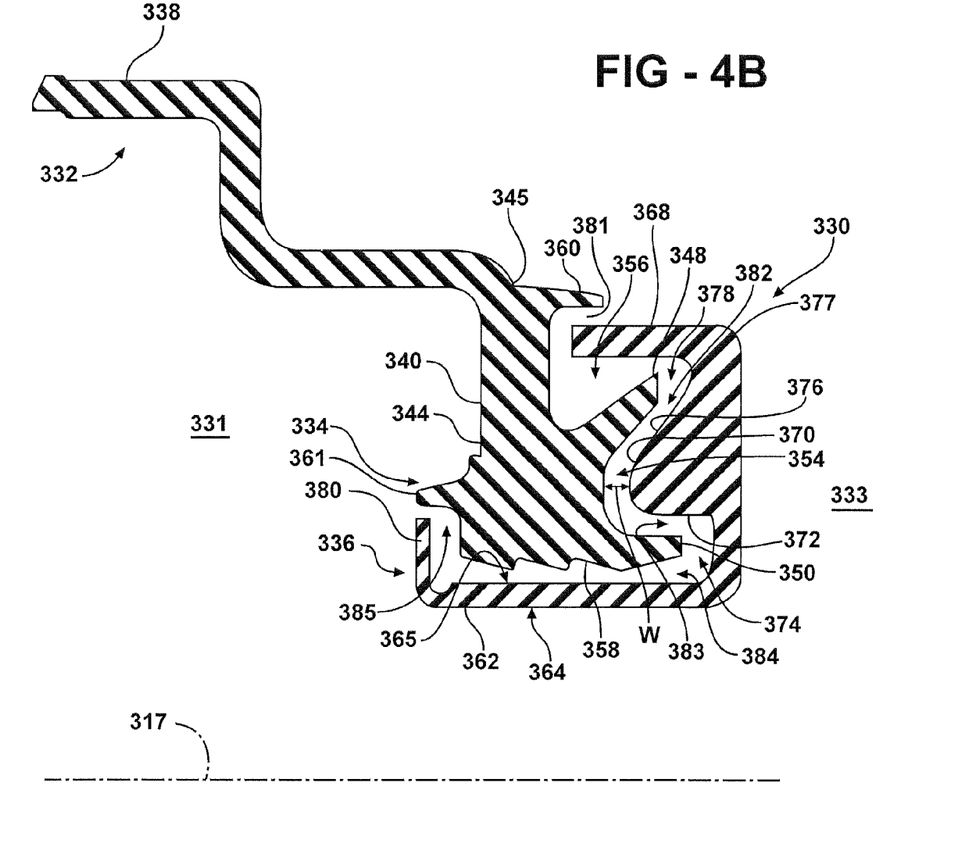
FIG. 4B is an enlarged cross-sectional view of a non-contact labyrinth seal assembly constructed in accordance with yet another presently preferred aspect of the invention.

In FIG. 4B, a non-contact labyrinth seal assembly 330 constructed in accordance with another presently preferred embodiment is shown, wherein the same reference numerals as used above, offset by a factor of 300, are used to identify similar features. The seal assembly 330 is configured having generally the same shape in axial cross-section as the previous assemblies 30, 130, 230, and includes an outer rigid carrier 332, a seal body 334 attached to the carrier 332, and an inner sleeve 336. However, rather than the carrier 332 and the seal body 334 being constructed of separate materials, in accordance with one method of constructing the assembly, they are constructed in accordance with another method of constructing the assembly by forming the carrier 332 and the seal body 334 as a single piece of material, such as in a molding process, for example Preferably, the carrier 332 and the seal body 334 are molded from a sufficiently rigid polymeric material to allow it to be attached or received in a housing, such as in an outer ring of a railway bearing assembly, for example. Further, the inner sleeve 336 is molded from a sufficiently rigid polymeric material to allow it to be received about a shaft.

The carrier 332 has a generally cylindrical outer flange 338 extending axially relative to a central axis 317 with a leg 340 extending radially inwardly from the outer flange 338. The leg 340 has opposite oil and air sides 344, 345 facing an oil side 331 and air side 333.

The seal body 334 has a pair of lips 348, 350 diverging from one another as described above to provide a first annular channel 354 between the lips 348, 350 and a second annular channel 356 between the radially outward lip 348 and the leg 340. Further, the body has an undulating surface 358 facing radially inwardly toward the central axis 317, and further includes an exclusion lip 360 and a containment lip 361 as described above with regard to the previous embodiments.

The inner sleeve 336 has an axially extending cylindrical wall 362 with an inner surface 364 and an outer surface 365, with the inner surface 364 being configured for operable disposal about a shaft, inner race of a bearing, or a spacer ring. The sleeve 336 has a containment flange 380 extending radially outwardly from the cylindrical wall 362, wherein the containment flange 380 functions similarly as discussed above. The sleeve 336 further includes an exclusion flange 368 and an annular projection 370 extending axially inwardly between the cylindrical wall 362 and the exclusion flange 368. The projection 370 is generally nose shaped, having generally the same inside conour as that of the projection 270 discussed above. As such, the projection 370 has an annular lower, radially inward inner surface 372 spaced radially outward in overlapping relation with the cylindrical wall 362 to provide an annular pocket 374 between the projection 370 and the cylindrical wall 362. The projection 370 has an annular upper, radially outward inner surface 376 diverging radially outwardly from the lower inner surface 372 toward the air side 333, wherein the upper inner surface 376 transitions to the exclusion flange 368 at a reverse molded portion 377. Accordingly, another annular pocket 378 is formed between the upper inner surface 376 and the exclusion flange 368.

When assembled, the annular projection 370 extends axially into the first annular channel 354 to provide a non-contact labyrinth passage 382 that extends along a serpentine path between the respective radially outward and radially inward lips 348, 350 and the annular projection 370. Further, the radially inward lip 350 extends into the pocket 374 in non-contacting relation to provide a non-contact labyrinth passage 383 extending in open communication from the labyrinth passage 382, wherein the labyrinth passage 383 extends over a generally U-shaped or serpentine path within the pocket 374. Further again, the undulating surface 358 extends axially in spaced relation from the outer surface 365 of the sleeve wall 362 to provide a non-contact labyrinth passage 384 extending axially in open communication from the labyrinth passage 383. In addition, the exclusion flange 368 extends in radially outward, spaced overlapping relation with the second annular channel 356 and the exclusion lip 360 extends in spaced, overlapping relation with the exclusion flange 368 to provide a gap, wherein the gap provides a generally horizontally extending, non-contact labyrinth passage 381 configured in open communication with the second annular channel 356. Further, as in the previous embodiments, the containment flange 380 extends radially outwardly from the cylindrical wall 362 beyond the undulating surface 358, while remaining axially spaced from the undulating surface 358 to maintain a non-contact labyrinth passage 385 extending in open communication from the labyrinth passage 384.

Figure 4C:
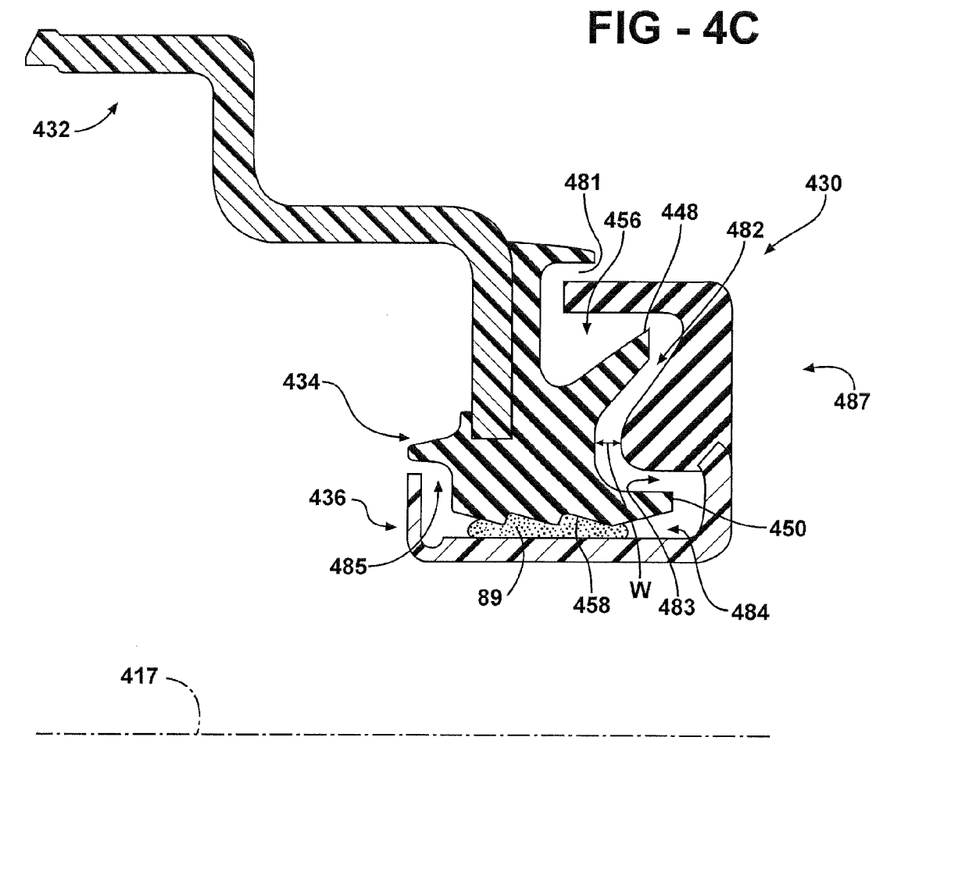
FIG. 4C is an enlarged cross-sectional view of a non-contact labyrinth seal assembly constructed in accordance with yet another presently preferred aspect of the invention.

In FIG. 4C, a non-contact labyrinth seal assembly 430 constructed in accordance with another presently preferred embodiment is shown, wherein the same reference numerals as used above, offset by a factor of 400, are used to identify similar features. The seal assembly 430 is configured having generally the same shape in axial cross-section taken along an axis 417 as the previous assemblies 30, 130, 230, 330 and includes an outer rigid carrier 432, a seal body 434 attached to the carrier 432, an inner sleeve 436, and a polymeric body 487 attached to the inner sleeve 436. As with the assembly 330, the seal assembly 430 is molded of polymeric materials, however, rather than the carrier 432 and the seal body 434 being constructed of the same material, they are constructed in accordance with another method of constructing the assembly by molding the carrier 432 and the seal body 434 as separate pieces attached to one another, and thus, can be molded using different types of polymeric materials. Accordingly, the carrier 432 can be formed by molding it using one rigid polymeric material, while the seal body 434 can be formed by molding it using a second, elastic polymeric material, such as rubber, for example. Similarly, the inner sleeve 436 can be molded from a sufficiently rigid polymeric material to allow it to be received about a shaft, while the polymeric body 487 can be molded from a second, elastic polymeric material, such as rubber, for example.

When assembled, as with the previous embodiments, labyrinth passages 482, 483, 484, and 485 are provided having a generally or substantially constant width (W) extending along a radially outward lip 448, a radially inward lip 450 and an undulating surface 458. Further, a non-contact labyrinth passage 481 is configured in open communication with an annular channel 456, which in turn, is in open communication with the labyrinth passage 482. Lastly, a lubricant, such as a grease 89 of suitable weight can be provided in the labyrinth passage 484 between the undulating surface 458 and the inner sleeve 436 to further inhibit the ingress of contamination and the egress of lubricant.

Obviously, many modifications and variations of the present invention are possible in light of the above teachings It is, therefore, to be understood that within the scope of the appended claims, the invention may be practiced otherwise than as specifically described.

What is claimed is:

1. A non-contact labyrinth seal assembly, comprising:
an outer rigid carrier having a generally cylindrical outer flange extending axially relative to a central axis of said assembly with a leg extending radially inwardly from said outer flange toward said central axis;

a body attached to said leg, said body having a radially outward lip and radially inward lip, said lips extending axially from said leg toward an air side of said assembly with said radially outward lip diverging outwardly from said central axis to provide a first annular channel between said lips and a second annular channel between said radially outward lip and said leg, said first annular channel facing axially toward said air side and said second annular channel facing radially outwardly from said central axis;

a sleeve having an axially extending cylindrical wall with an annular first flange extending radially outwardly from said wall, said first flange having an annular projection extending axially into said first annular channel to provide a non-contact labyrinth passage extending along a serpentine path between said lips and said annular projection; and wherein said body is spaced in completely non-contacting relation with said sleeve.

2. The seal assembly of claim 1 wherein said labyrinth passage maintains a substantially constant width between said lips and said annular projection.

3. The seal assembly of claim 1 wherein said first flange has an upstanding wall with a substantially constant width with said annular projection being plastically deformed in said upstanding wall.

4. The seal assembly of claim 1 wherein said body has an undulating surface facing radially inwardly toward said central axis, said undulating surface extending axially in spaced relation from an outer surface of said sleeve wall.

5. The seal assembly of claim 4 wherein said labyrinth passage maintains a generally constant width between said lips and said annular projection, and between said undulating surface and said outer surface of said sleeve wall.

6. The seal assembly of claim 4 wherein said sleeve has a containment flange extending radially outwardly from said wall radially beyond said undulating surface.

7. The seal assembly of claim 6 wherein said body has a containment lip extending axially toward an oil side of said assembly in radially overlapping relation with said containment flange.

8. The seal assembly of claim 1 wherein said sleeve has an exclusion flange extending axially from said first flange in radially outward overlapping relation with said second annular channel.

9. The seal assembly of claim 8 wherein said exclusion flange is spaced from said radially outward lip.

10. The seal assembly of claim 8 wherein said body has an exclusion lip extending axially from said leg in overlapping relation with said exclusion flange.

11. The seal assembly of claim 10 wherein said exclusion lip is spaced from said exclusion flange to provide a labyrinth passage between said exclusion lip and said exclusion flange.

12. The seal assembly of claim 11 wherein said exclusion lip is radially outward from said exclusion flange.

13. The seal assembly of claim 1 wherein said carrier and said body are formed as a single piece of the same material.

14. The seal assembly of claim 13 wherein said sleeve and said annular projection are formed as a single piece of the same material.

15. The seal assembly of claim 1 wherein said carrier and said body are formed as separate pieces of different material.

16. The seal assembly of claim 15 wherein said sleeve and said annular projection are formed as separate pieces of different material.

17. A seal assembly, comprising:

an outer rigid carrier having a generally cylindrical outer flange extending axially relative to a central axis of said assembly with a leg extending radially inwardly from said outer flange toward said central axis;

a seal body attached to said leg, said body having a radially outward lip and radially inward lip extending axially from said leg and diverging radially from one another toward an air side of said assembly to provide a first divergent annular channel between said lips and a second divergent channel between said radially outward lip and said leg;

a sleeve having cylindrical wall with an annular first flange extending radially outwardly from said wall, and covering said second divergent channel, said first flange having an annular projection extending axially into said first channel; and wherein said seal body is spaced in completely non-contacting relation with said sleeve.

18. The seal assembly of claim 1 wherein the seal body is entirely spaced out of contact with said sleeve.

* * * * *